US011079587B2

(12) United States Patent
Regensburger et al.

(10) Patent No.: US 11,079,587 B2
(45) Date of Patent: Aug. 3, 2021

(54) MICROSCOPY SYSTEM AND MICROSCOPY METHOD FOR QUANTIFYING A FLUORESCENCE

(71) Applicant: Carl Zeiss Meditec AG, Jena (DE)

(72) Inventors: Alois Regensburger, Erlangen (DE); Christoph Hauger, Aalen (DE); Susanne Kohlhammer, Blaustein (DE); Jonathan Essig, Neresheim (DE)

(73) Assignee: Carl Zeiss Meditec AG, Jena (DE)

( * ) Notice: Subject to any disclaimer, the term of this patent is extended or adjusted under 35 U.S.C. 154(b) by 430 days.

(21) Appl. No.: 15/910,225

(22) Filed: Mar. 2, 2018

(65) Prior Publication Data

US 2018/0252909 A1 Sep. 6, 2018

(30) Foreign Application Priority Data

Mar. 2, 2017 (DE) .................... 10 2017 203 448.3

(51) Int. Cl.
*H04N 7/18* (2006.01)
*G02B 21/36* (2006.01)
(Continued)

(52) U.S. Cl.
CPC ....... *G02B 21/365* (2013.01); *G01N 21/6458* (2013.01); *G02B 21/02* (2013.01);
(Continued)

(58) Field of Classification Search
CPC ....... A61B 3/102; A61B 3/1225; A61B 3/005; H04N 9/045; H04N 9/04553;
(Continued)

(56) References Cited

U.S. PATENT DOCUMENTS 8,228,368 B2 7/2012 Zhao et al.
2008/0266564 A1 10/2008 Themelis
(Continued)

FOREIGN PATENT DOCUMENTS

DE 10 065 146 A1 7/2002
DE 10 2008 018 637 A1 10/2009
(Continued)

OTHER PUBLICATIONS

Valdes et al. "Quantitative fluorescence in intracranial tumor: implications for ALA-induced PpIX as an intraoperative biomarker," Journal of Neurosurgery, vol. 115, No. 1, pp. 11-17, Jul. 2011.
(Continued)

*Primary Examiner* — Masum Billah
(74) *Attorney, Agent, or Firm* — Falk Ewers; Ewers IP Law PLLC

(57) ABSTRACT

A microscopy method for quantifying a fluorescence of protoporphyrin IX includes: imaging an object region onto a first detector field and a second detector field, wherein a first optical filter and a second optical filter, respectively, are arranged in the beam paths between the object region and the detector fields, the first optical filter and second optical filter respectively having a wavelength-dependent transmission characteristic; exciting at least a first fluorescence of protoporphyrin IX and a second fluorescence; recording first images and second images; and determining a spatially dependent fluorescence intensity of the first fluorescence in the object region by virtue of determining values representing a fluorescence intensity at locations in the object region, wherein the values are determined on the basis of the radiation intensities of the two detector fields detected in a spatially dependent manner and the spatially dependent wavelength-dependent detection efficiencies of the two detector fields.

26 Claims, 4 Drawing Sheets

(51) Int. Cl.
*G01N 21/64* (2006.01)
*G02B 21/02* (2006.01)
*G02B 21/16* (2006.01)

(52) U.S. Cl.
CPC ........... *G02B 21/16* (2013.01); *G02B 21/368* (2013.01); *G01N 2021/6421* (2013.01); *G01N 2021/6471* (2013.01); *G02B 21/361* (2013.01)

(58) Field of Classification Search
CPC .. H04N 9/04555; H04N 9/04559; H04N 9/64; A61M 31/005; A61M 11/00; A61M 2205/0244; A61M 37/00; G01B 11/24; G06F 16/51; G06F 16/583; G06F 16/5838; G06F 19/00; G06F 19/321; G06F 19/3418; G06F 19/3481; G06K 9/00496; G06K 9/209; G06K 9/60; G06K 9/6227
USPC .......................................................... 348/80
See application file for complete search history.

(56) References Cited

U.S. PATENT DOCUMENTS

| | | |
|---|---|---|
| 2009/0266999 A1 | 10/2009 | Krattiger |
| 2010/0110538 A1 | 5/2010 | Steffen et al. |
| 2012/0080616 A1 | 4/2012 | Schoenborn |
| 2014/0378843 A1* | 12/2014 | Valdes ................... G02B 21/36 600/476 |
| 2015/0346098 A1 | 12/2015 | Hauger et al. |
| 2016/0139391 A1 | 5/2016 | Hauger et al. |

FOREIGN PATENT DOCUMENTS

| | | | |
|---|---|---|---|
| DE | 10 2009 029 831 A1 | 1/2011 | |
| DE | 10 2006 004 232 C5 | 8/2013 | |
| DE | 10 2014 008 243 A1 | 12/2015 | |
| DE | 10 2015 216 570 A1 | 3/2016 | |
| DE | 10 2015 216 570 A1 | 11/2016 | |
| DE | 10 2015 011 429 A1 | 3/2017 | |
| DE | 10 2015 011 441 A1 | 3/2017 | |
| DE | 102015011441 A1 * | 3/2017 | ......... G01N 21/6428 |
| DE | 10 2014 016 850 B9 | 7/2017 | |
| EP | 1 952 106 B1 | 8/2014 | |
| WO | 2017/036600 A1 | 3/2017 | |
| WO | 2017/036602 A1 | 3/2017 | |

OTHER PUBLICATIONS

Office Action by the German Patent and Trademark Office, and translation thereof, issued in German Counterpart application No. 10 2017 203 448.3, dated Jan. 9, 2018.

* cited by examiner

MICROSCOPY SYSTEM AND MICROSCOPY METHOD FOR QUANTIFYING A FLUORESCENCE

CROSS REFERENCE TO RELATED APPLICATIONS

This application claims priority to German patent application DE 10 2017 203 448.3 filed on Mar. 2, 2017, which is hereby incorporated by reference in its entirety.

TECHNICAL FIELD

The present disclosure relates to microscopy systems and microscopy methods, in which one or more fluorescences are detected, and wherein the strength of a fluorescence or the concentration of a fluorescent material in a tissue can be quantified. In particular, the microscopy system can be embodied as an operating microscope which is used within the scope of surgical interventions and which has two eyepieces or one or two cameras and two electronic displays for observing an image of an object region.

BACKGROUND

A conventional microscopy system for detecting a fluorescence or a plurality of fluorescences simultaneously is known from DE 10 2015 011 441 A1 by the applicant, the entire disclosure thereof being incorporated in the present application. The plurality of fluorescences comprise protoporphyrin IX (PpIX), fluorescein, and indocyanine green (ICG), for example. These fluorescent dyes are used in the medical field, in particular, for staining biological material, blood cells, tumors, or other tissues, for example also in the laboratory.

Protoporphyrin IX and the precursor thereof, 5-aminolevulinic acid (5-ALA), are highly effective markers for certain tissue types. Therefore, it is desirable not only to detect, but also quantify the fluorescence of protoporphyrin IX in order to determine the intensity of the fluorescence in the tissue, in which the fluorescent dye has accumulated, or the concentration of the fluorescent dye in the tissue, in which it has accumulated. Using the conventional microscopy systems mentioned above, this is not yet possible to the full satisfaction of the users.

SUMMARY

Accordingly, it is an object of the present disclosure to propose a microscopy system and a microscopy method for quantifying a fluorescence, wherein the fluorescence to be quantified may be one of a plurality of detected fluorescences.

According to embodiments of the disclosure, a microscopy method for quantifying a fluorescence includes imaging an object region on a first detector field and on a second detector field, which each have a multiplicity of pixels. The number of pixels in the first detector field and in the second detector field may differ from one another and may have different dimensions from one another. By way of example, the detector field can be a CCD detector.

For the purposes of imaging the object region onto the first detector field and the second detector field, use can be made of a microscopy optical unit which provides a first beam path from the object region to the first detector field and a second beam path from the object region to the second detector field. The microscope optical unit may comprise an objective lens which is arranged in the first beam path and in the second beam path. The microscopy optical unit may further comprise a beam splitter for dividing the beam path between the object region and the two detector fields into the first beam path and the second beam path. In particular, an objective lens may be arranged in the beam paths between the object region and the beam splitter. However, it is also possible for respectively one objective lens to be arranged in the first beam path and in the second beam path between the beam splitter and the respective detector field. The objective lens itself may be constructed from one or more lens elements. The objective lens is an optical component which, possibly together with further optical components, provides optical imaging from the object region to the first detector field and second detector field, respectively.

At least one first optical filter with a wavelength-dependent transmission characteristic is arranged in the first beam path between the object region and the first detector field. At least one second optical filter with a wavelength-dependent transmission characteristic that differs from the first wavelength-dependent transmission characteristic is arranged in the second beam path between the object region and the second detector field.

If the microscopy optical unit comprises a beam splitter, the first optical filter and the second optical filter may comprise the beam splitter. To this end, the beam splitter may have dichroic properties such that the beam splitter has different wavelength-dependent transmission characteristics for the first beam path and the second beam path. The first optical filter and the second optical filter may further comprise further filter elements in each case; these may be arranged at any point in the first or second beam path. These filter elements may be homogeneous large-area filter elements which extend over the whole cross section of the first or second beam path. Further, the filter elements may comprise a field of optical filters which is arranged immediately in front of the first or second detector field in such a way that different optical filters are arranged in the beam path upstream of mutually adjacent pixels, the different optical filters having spectral transmissions that differ from one another.

The microscopy method further includes exciting at least two fluorescences in the object region, wherein a first of the two fluorescences may be the fluorescence of protoporphyrin IX. A second of the two fluorescences may be an autofluorescence of a tissue in which the fluorescent dye producing the first fluorescence has accumulated.

The method further includes determining a spatially dependent fluorescence intensity of the first fluorescence in the object region. To this end, one value is determined in each case for a plurality of pixels or a plurality of groups of pixels in the first detector field, the value representing a fluorescence intensity at the location in the object region imaged onto the respective pixel or the group of pixels. The plurality of pixels for which this value is determined may be, in particular, all pixels of the first detector field, and so the value for each pixel of the first detector field is determined. However, the plurality of pixels may also be a subset of pixels of the first detector field, and so the value is only determined for every third or every fourth pixel of the detector field, for example. Further, it is possible that respectively one value is determined for groups of pixels, the value representing the fluorescence intensity at the (extended) location imaged onto the group of pixels. By way of example, such groups of pixels may comprise four or nine or 16 mutually adjacent pixels.

This value determined for a respective pixel or a respective group of pixels of the first detector field is determined on the basis of at least the following variables:

the radiation intensity detected by the pixel or the group of pixels of the first detector field;

the radiation intensity detected by a pixel or a group of pixels of the second detector field, with the same location in the object region being imaged onto this pixel or this group of pixels as is also imaged on the above-described pixel or the above-described group of pixels of the first detector field;

a wavelength-dependent detection efficiency of the pixel or the group of pixels of the first detector field;

a wavelength-dependent detection efficiency of the pixel or the group of pixels of the second detector field;

the fluorescence spectrum of the first fluorescence; and the fluorescence spectrum of the second fluorescence.

The radiation intensity detected by a pixel is represented by a value which is read from the pixel of the detector field by a controller. By way of example, if the detector field is embodied as a CCD detector, this value represents a charge that was accumulated in the pixel during an exposure time. The value may be represented by a number which comprises seven bits, for example. In the case of a group of pixels, the radiation intensities detected by the pixels of the group are combined, for example added or averaged or the like.

This wavelength-dependent detection efficiency describes the probability with which a light quantum with a given wavelength, emanating from a location of the object field, is detected by the pixel or the group of pixels on which this location is imaged. This probability depends on the wavelength. The wavelength dependence of the detection efficiency is substantially determined by the wavelength-dependent transmission characteristic of the at least one optical filter arranged in the beam path between the object region and the respective pixel. Further, wavelength-dependent transmission characteristics of other optical elements in the beam path, such as e.g. of lenses, influence the wavelength-dependent detection efficiency of a pixel or of a group of pixels. The wavelength-dependent detection efficiency of the pixels may vary between mutually adjacent pixels of the detector field, for example on account of different angles at which radiation is incident on pixels arranged at different locations in the detector field or on account of manufacturing-induced variations, for example of the semiconductor material of the pixels.

The fluorescence spectrum of the first fluorescence or the second fluorescence may have been determined by measurement or by calculation.

According to exemplary embodiments, the value representing the fluorescence intensity at the location in the object region is determined by the following formula:

$$C_F(x, y) = \frac{U_{1A} \cdot S_2(k, l) - U_{2A} \cdot S_1(i, j)}{U_{2F} \cdot U_{1A} - U_{2A} \cdot U_{1F}},$$

where $C_F(x,y)$ is the value representing the fluorescence intensity of protoporphyrin IX at the location (x,y) in the object plane, $S_1(i,j)$ represents the radiation intensity detected by the pixel (i,j) or the group (i,j) of pixels of the first detector field, wherein the location (x,y) is mapped onto the pixel (i,j) or the group (i,j) of pixels by way of the first beam path, $S_2(k,l)$ represents the radiation intensity detected by the pixel (k,l) or the group (k,l) of pixels of the second detector field, wherein the location (x,y) is mapped onto the pixel (k,l) or the group (k,l) of pixels by way of the second beam path, and $U_{1F}$, $U_{1A}$, $U_{2F}$, and $U_{2A}$ are variables which depend on the wavelength-dependent detection efficiencies of the pixels or group of pixels.

The pixels or groups of pixels of the first detector field and of the second detector field are denoted with different indices (i,j) and (k,l), respectively, here since the two detector fields may have different numbers of pixels and different dimensions and the pixels may be combined to differently large and differently designed groups. Each location on the object region is imaged on a pixel or a group of pixels (i,j) of the one detector and on a pixel or a group of pixels (k,l) of the other detector, as result of which the one pixel or one group of pixels (i,j) and (k,l) are linked to one another.

The variables $U_{1F}$, $U_{1A}$, $U_{2F}$, and $U_{2A}$ may be determined in different ways. By way of example, some of these variables may be determined experimentally by virtue of a measurement being carried out in a region of the object where the assumption is made that one of the at least two fluorescences is not excited there. By way of example, an image of a region with healthy tissue can be recorded to this end, with the assumption being made that protoporphyrin IX is not present with any significant concentration in this region. Then, the measured fluorescence is only the autofluorescence of the tissue, which can be assumed to be independent of the type of tissue.

Further, all or some of the variables $U_{1F}$, $U_{1A}$, $U_{2F}$, and $U_{2A}$ may be determined by calculation using one of the following equations:

$$U_{1F} = \int_{\lambda min}^{\lambda max} S_F(\lambda) \cdot D_{1,i,j}(\lambda) \cdot d\lambda,$$

$$U_{2F} = \int_{\lambda min}^{\lambda max} S_F(\lambda) \cdot D_{2,k,l}(\lambda) \cdot d\lambda,$$

$$U_{1A} = \int_{\lambda min}^{\lambda max} S_A(\lambda) \cdot D_{1,i,j}(\lambda) \cdot d\lambda, \text{ and}$$

$$U_{2A} = \int_{\lambda min}^{\lambda max} S_A(\lambda) \cdot D_{2,k,l}(\lambda) \cdot d\lambda$$

wherein $S_F(\lambda)$ represents the fluorescence spectrum of the first fluorescence, $S_A(\lambda)$ represents the fluorescence spectrum of the second fluorescence, $D_{1,i,j}(\lambda)$ represents the detection efficiency, dependent on the wavelength $\lambda$, of the pixel (i,j) or the group (i,j) of pixels of the first detector field and $D_{2,i,j}(\lambda)$ represents the detection efficiency, dependent on the wavelength $\lambda$, of the pixel (k,l) or the group (k,l) of pixels of the further detector field.

Here, for all pixels (i,j) or groups (i,j) of pixels of the first detector field, $D_{1,i,j}(\lambda)$ can be set equal to a wavelength-dependent detection efficiency $D_1(\lambda)$ that is independent of the pixel location. This means that the assumption is made that the pixels or groups of pixels of the first detector field do not differ, or only differ slightly, from one another in respect of their detection efficiency. Likewise, for all pixels (k,l) or groups $T_{2,k,l}(\lambda)$ of pixels of the second detector field, $D_{2,i,j}(\lambda)$ can be set equal to a wavelength-dependent detection efficiency $D_2(\lambda)$ that is independent of the pixel location.

Further, it is possible to determine values for $D_{1,i,j}(\lambda)$ and/or $D_{2,i,j}(\lambda)$ experimentally by virtue of, for example, a white article arranged in the object region being illuminated in succession by light having a given intensity and different wavelengths from the wavelength range between $\lambda$min and $\lambda$max, and the radiation intensity detected by the pixel or the group of pixels being recorded. The detected wavelength-dependent radiation intensity can be used directly as the function $D_{1,i,j}(\lambda)$ or $D_{2,i,j}(\lambda)$, or it can be used as the latter after multiplication by a normalization factor, for example.

According to exemplary embodiments, $D_{1,i,j}(\lambda)$ is set equal to $T_{1,i,j}(\lambda)$, where $T_{1,i,j}(\lambda)$ is the wavelength-dependent transmission characteristic of the at least one first optical filter arranged in the first beam path between the object region and the pixel (i,j) or the group (i,j) of pixels of the first detector field, and/or wherein $D_{2,i,j}(\lambda)$ is set equal to $T_{2,k,l}(\lambda)$, where $T_{2,k,l}(\lambda)$ is the wavelength-dependent transmission characteristic of the at least one second optical filter arranged in the further beam path between the object region and the pixel (k,l) or the group (k,l) of pixels of the second detector field.

Here, the assumption is made that the detection efficiency is substantially determined by the wavelength-dependent transmission characteristics of the filters. These can, in turn, be ascertained by measurement or by calculation. If the filters producing the wavelength-dependent transmission characteristics extend sufficiently homogeneously over the entire cross section of the first beam path and of the second beam path, respectively, then $T_{1,i,j}(\lambda)$ can be set equal to $T_1(\lambda)$. Likewise, $T_{2,k,l}(\lambda)$ can be set equal to $T_2(\lambda)$. This means that it is assumed that the detection efficiency does not vary between the pixels or groups of pixels of a detector field.

The first wavelength-dependent transmission characteristic differs from the second wavelength-dependent transmission characteristic. According to exemplary embodiments, this can be realized by virtue of a first wavelength and a second wavelength existing such that the transmission at the first wavelength of the at least one first filter arranged between a location (x,y) in the object region and the pixel (i,j) or the group (i,j) of pixels of the first detector field on which the location (x,y) is imaged is at least 1.5 times, in particular at least 5 times and in particular at least 20 times greater than the transmission at the first wavelength of the at least one second filter arranged between the location (x,y) in the object region and the pixel (k,l) or the group (k,l) of pixels of the second detector field on which the location (x,y) is imaged and the transmission at the second wavelength of the at least one first filter arranged between the location (x,y) in the object region and the pixel (i,j) or the group (i,j) of pixels of the first detector field is at least 1.5 times, in particular at least 5 times and in particular at least 20 times smaller than the transmission at the second wavelength of the at least one second filter arranged between the location (x,y) in the object region and the pixel (k,l) or the group (k,l) of pixels of the second detector field.

BRIEF DESCRIPTION OF THE DRAWINGS

The disclosure will now be described with reference to the drawings wherein:

FIG. 1 shows an exemplary embodiment of a microscopy system 1 for carrying out a microscopy method for quantifying a fluorescence. The microscopy system 1 comprises at least one light source 3, which produces light in order to direct a light beam 5 onto an object region 7. Arranged in the object region 7 is an object 9 which contains at least one fluorescent dye and which produces at least two fluorescences in the case of a corresponding excitation. In the exemplary embodiment explained here, the at least one fluorescent dye is protoporphyrin IX and the one of the at least two fluorescences is the fluorescence of protoporphyrin IX. In the exemplary embodiment explained here, the second fluorescence of the at least two fluorescences is an autofluorescence of the object 9, which is likewise excited when the fluorescence of protoporphyrin IX is excited. The autofluorescence is produced independently of whether or not protoporphyrin IX is contained in the object 9. By way of example, the object 9 may comprise human or animal cells, which are kept in a cell culture or which are integrated into a body tissue. In the cells, the protoporphyrin IX is produced as a metabolite from 5-ALA.

Figure 1:
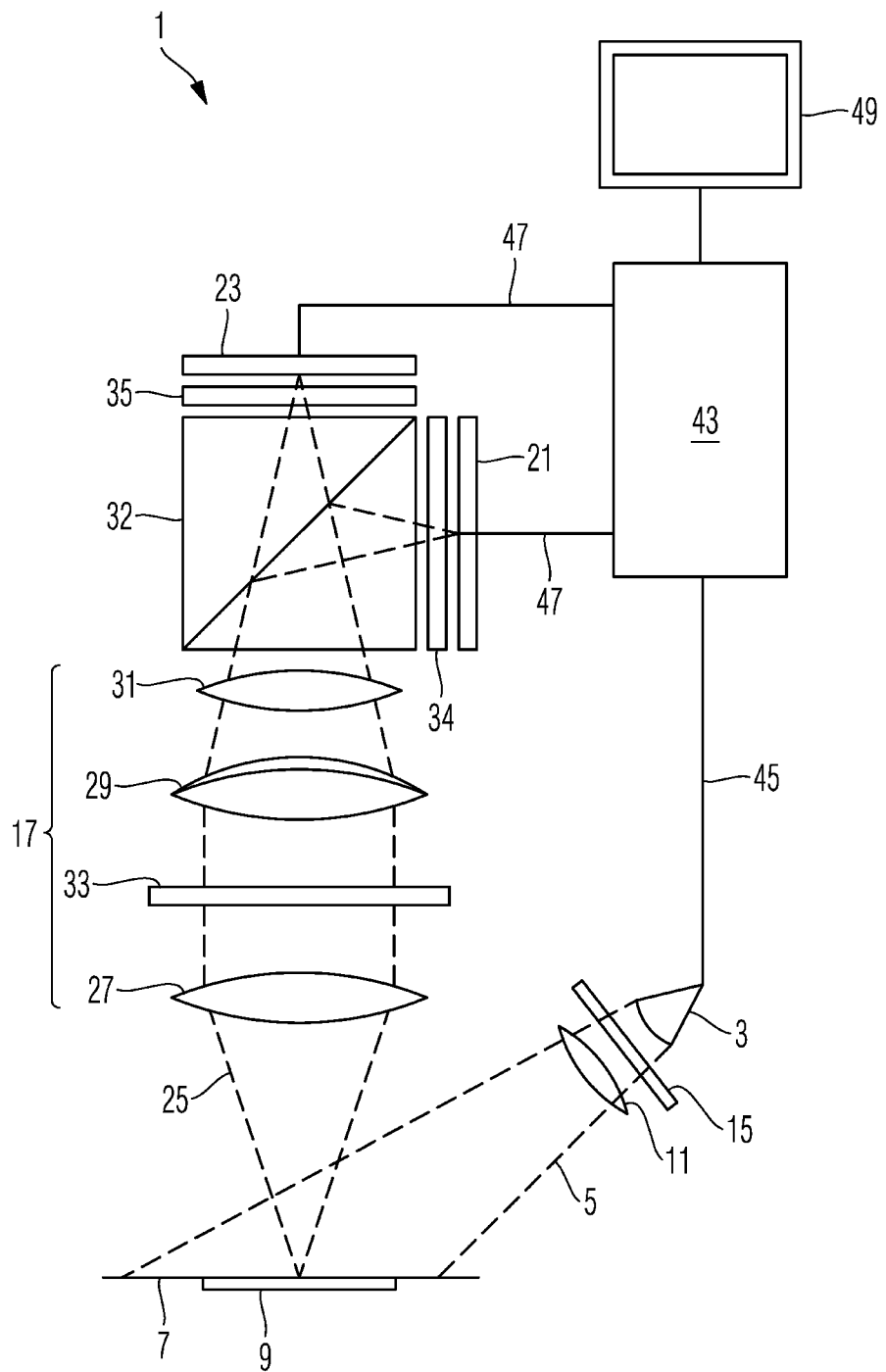
FIG. 1 shows a schematic illustration of a microscopy system according to an exemplary embodiment for carrying out a microscopy method according to an exemplary embodiment.

In addition to the light source 3, the microscopy system 1 comprises an illumination optical unit 11 made of one or more lenses to produce a light beam 5 that is directed onto the object region 7. An optical filter 15 is arrangeable in the beam path between the light source 3 and the object region 7. The light source 3 is operated by a controller 43 by way of a control line 45. Further, provision can be made of an actuator, e.g., a motor, which selectively arranges the optical filter 15 in the beam path between the light source 3 and the object region 7 or removes the optical filter 15 from the beam path. This actuator may likewise be controlled by the controller 43. By way of example, the light source 3 can produce white light to illuminate the object 9 in the object region 7 with this white light such that the object 9 can be observed directly with the eye or such that images from the object region 7 which show the object 9 with a natural color impression can be recorded. If the optical filter 15 is arranged in the beam path between the light source 3 and the object region 7, it can shape the spectrum of the illumination light in the beam 5 in such a way that substantially only light from a wavelength range serving to excite the fluorescences can reach the object region. If the fluorescence of protoporphyrin IX should be excited, this excitation light lies in a wavelength range between 350 nm and 470 nm, for example.

The microscopy system 1 further comprises an objective 17 which has a plurality of lenses 27, 29, and 31. The objective 17 serves to provide a beam path 25 emanating from the object region 7 in order to image the object region 7 onto two detector fields 21 and 23. To this end, a beam splitter 32 is arranged in the beam path 25 downstream of the objective 17, the beam splitter dividing the beam path 25 into a first beam path and a second beam path, with the first beam path extending from the object region 7 to the first detector field 21 and the second beam path extending from the object region 7 to the second detector field 23.

In the exemplary embodiment shown in FIG. 1, the beam splitter 32 is arranged in the beam paths between the objective 17 and the two detector fields 21 and 23, respectively. As an alternative thereto, it is possible for the beam splitter to be arranged not in the beam path downstream of an objective but in the beam path upstream thereof. Then, the beam splitter divides the beam path emanating from the object region into two partial beam paths, with a first objective and the first detector field being arranged in a first beam path and a second objective and the second detector field being arranged in the second beam path.

A first optical filter 33 is arranged in the first beam path and in the second beam path, a second optical filter 34 is only arranged in the first beam path and a third optical filter 35 is only arranged in the second beam path. The optical filters 33, 34, and 35 may each be fixedly arranged in the beam paths or may optionally be arranged in the beam paths and removed therefrom, with it once again being possible to provide actuators to this end, the actuators being controlled by the controller 43.

The beam splitter 32 may be a dichroic beam splitter, meaning that it provides different wavelength-dependent transmission characteristics for the first beam path and the second beam path.

The detector fields 21 and 23 each have a multiplicity of pixels. Each pixel is configured to output a signal representing a light intensity incident on the pixel. The light intensities detected by the pixels are read by the controller 43 via a signal line 47.

In the exemplary embodiment explained here, the detector field 21 is the detector field of an infrared camera. This means that the pixels of the detector field 21 are able to detect infrared light. The optical filter 34 can be configured in such a way that it only allows infrared light to pass.

In the exemplary embodiment explained here, the detector field 23 is the detector field of a color camera with a chip or a detector field. This means that a field of optical filters, not illustrated in FIG. 1, is arranged in a regular arrangement pattern in the beam path upstream of the detector field, with optical filters arranged upstream of mutually adjacent pixels having different wavelength-dependent transmission characteristics. Such a field of optical filters is also referred to as a Bayer matrix or Bayer pattern.

As an alternative thereto, a color camera may also be realized with a plurality of detector fields, which are supplied with light via dichroic beam splitters for the purposes of selecting color channels, instead of a single detector field having arranged upstream thereof a field of optical filters with different wavelength-dependent transmission characteristics or a Bayer pattern for the purposes of selecting color channels. Then, a pixel (k,l) or a group of pixels (k,l), on which a given location (x,y) of the object region is imaged, is contained in each of the detector fields.

The optical filter 35 may be introduced into the second beam path if the fluorescence of the fluorescent dye should be observed and it may be removed from the second beam path if a normal color image should be recorded using the detector field 23.

The optical filter 33, the beam splitter 32 and the optical filter 34 together provide a wavelength-dependent transmission characteristic $T_1(\lambda)$, which determines the efficiency with which a light quantum with a certain wavelength A, emanating from the object region 7, is detected by the pixels of the detector field 21. Further, this detection efficiency is also determined by the properties of the semiconductor material of the pixels of the detector field 21, for example, and so a wavelength-dependent detection efficiency $D_{1,i,j}(\lambda)$ can be assigned to each pixel.

Similarly, the optical filter 33, the beam splitter 32 and the optical filter 35 determine the wavelength-dependent transmission characteristic in the second beam path to the pixels of the detector field 23, wherein each pixel can be assigned a separate wavelength-dependent transmission characteristic $T_{2,k,l}(\lambda)$ of the optical filters in the second beam path on account of the field of optical filters upstream of the detector field 23. Taking account of the detection properties of the pixels, it is then possible to assign each pixel a wavelength-dependent detection efficiency $D_{2,k,l}(\lambda)$.

Figure 2:
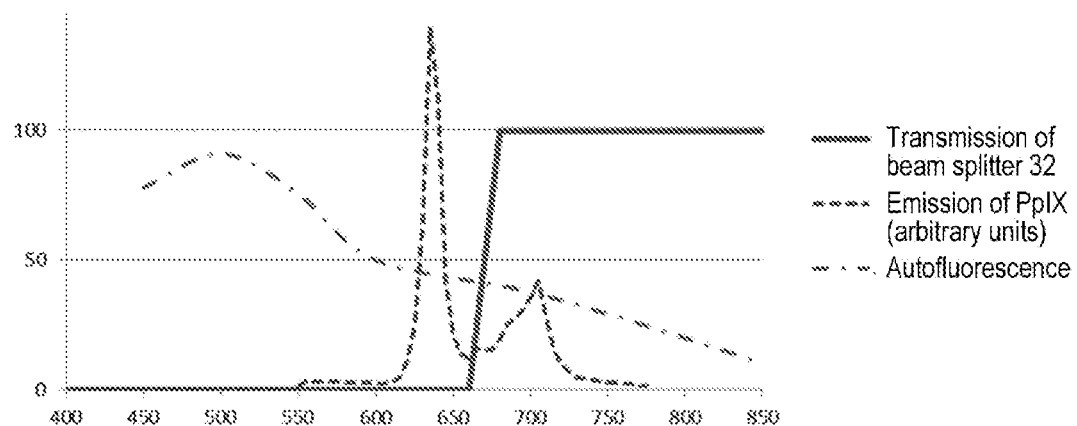
FIG. 2 shows a graph plotting an autofluorescence of a tissue, the emission of protoporphyrin IX and a transmission of a beam splitter of the microscopy system of FIG. 1 according to a first exemplary embodiment.

FIG. 2 shows a graph plotting the emission spectrum of the fluorescence of protoporphyrin IX in arbitrary units, the emission spectrum of the autofluorescence in arbitrary units and the wavelength-dependent transmission of the beam splitter 32 for the first beam path up to the first detector field 21.

It can be seen that the fluorescence of protoporphyrin IX and the autofluorescence are superposed on one another. The assumption is now made that the problem consists of quantifying the fluorescence of protoporphyrin IX at the various locations of the object 9 from the signals detected by the detector fields 21 and 23. To this end, the fluorescence of protoporphyrin IX must be separated from the autofluorescence. This is possible since the two beam paths provide different wavelength-dependent transmission characteristics to the detector fields 21 and 23 on account of the transmission of the beam splitter 32 shown in FIG. 2. In the case of the design of the beam splitter 32 shown in FIG. 2, the optical filters 33, 34 and 35 shown in FIG. 1 need not be arranged in the beam paths to quantify the fluorescence of protoporphyrin IX. However, in practice, it is conducive to the quality of the result if the filters situated in the beam paths when observing the fluorescence and further optical components are designed such that they do not allow light from the wavelength range used to excite the fluorescence to arrive at the detector fields.

The spatially dependent fluorescence intensity of the fluorescence of protoporphyrin IX can be determined by the controller 43 by virtue of it determining one value in each case for a plurality of pixels or a plurality of groups of pixels in the detector field 21 or in the detector field 23, the value representing a fluorescence intensity at a location in the object region imaged onto the respective pixel or the respective group of pixels. This value can be determined on the basis of the radiation intensity detected by this pixel or this group of pixels of the detector field 21, the wavelength-dependent detection efficiency of this pixel or this group of pixels, the radiation intensity detected by a pixel or a group of pixels of the detector field 23 on which the location in the object region is imaged, the wavelength-dependent detection efficiency of this pixel or of this group of pixels, the fluorescence spectrum of protoporphyrin IX and the fluorescence spectrum of the autofluorescence.

In particular, this value can be determined according to the following formula:

$$C_F(x, y) = \frac{U_{1A} \cdot S_2(k, l) - U_{2A} \cdot S_1(i, j)}{U_{2F} \cdot U_{1A} - U_{2A} \cdot U_{1F}}$$

where $C_F(x,y)$ is the value representing the fluorescence intensity of protoporphyrin IX at the location (x,y) in the object plane, $S_1(i,j)$ represents the radiation intensity detected by the pixel (i,j) or the group (i, of pixels of the first detector field 21, wherein the location (x,y) is mapped onto the pixel (i,j) or the group (i,j) of pixels by way of the first beam path, $S_2(k,l)$ represents the radiation intensity detected by the pixel (k,l) or the group (k,l) of pixels of the second detector field 23, wherein the location (x,y) is mapped onto the pixel (k,l) or the group (k,l) of pixels by way of the second beam path, and $U_{1F}$, $U_{1A}$, $U_{2F}$, and $U_{2A}$ are variables which depend on the wavelength-dependent detection efficiencies of the pixels or group of pixels.

The variables $U_{1F}$, $U_{1A}$, $U_{2F}$, and $U_{2A}$ may be determined, at least in part, by experiment by virtue of carrying out a measurement in a region of the object of which it is assumed that, for example, protoporphyrin IX is not present with any significant concentration in this region.

Further, the variables $U_{1F}$, $U_{1A}$, $U_{2F}$, and $U_{2A}$ may be determined at least in part by calculation using one of the following equations:

$$U_{1F} = \int_{\lambda min}^{\lambda max} S_F(\lambda) \cdot D_{1,i,j}(\lambda) \cdot d\lambda,$$

$$U_{2F} = \int_{\lambda min}^{\lambda max} S_F(\lambda) \cdot D_{2,k,l}(\lambda) \cdot d\lambda,$$

$$U_{1A} = \int_{\lambda min}^{\lambda max} S_A(\lambda) \cdot D_{1,i,j}(\lambda) \cdot d\lambda, \text{ and}$$

$$U_{2A} = \int_{\lambda min}^{\lambda max} S_A(\lambda) \cdot D_{2,k,l}(\lambda) \cdot d\lambda,$$

wherein $S_F(\lambda)$ represents the fluorescence spectrum of the first fluorescence, $S_A(\lambda)$ represents the fluorescence spectrum of the second fluorescence, $D_{1,i,j}(\lambda)$ represents the detection efficiency, dependent on the wavelength λ, of the pixel (i,j) or the group (i,j) of pixels of the first detector field 21, and $D_{2,i,j}(\lambda)$ represents the detection efficiency, dependent on the wavelength λ, of the pixel (k,l) or the group (k,l) of pixels of the further detector field 23.

The spatially dependent fluorescence intensity $C_F(x,y)$ can be represented as an image on a display apparatus 49 (see FIG. 1) by way of the controller 43.

The curve of the wavelength-dependent transmission characteristic for the first beam path shown in FIG. 2 leads to different spectral components being detected with different efficiencies by the two detector fields. This is why the variables $U_{1F}$ and $U_{1A}$, which are determined by integration over the detection efficiencies of the first detector field, have values that differ from one another, just like the variables $U_{2F}$ and $U_{2A}$, which are determined by integration over the detection efficiencies of the second detector field. These four different variables are included in the above equation for determining the values $C_F(x,y)$ and therefore facilitate the separation of the components of the two fluorescences from one another by computation and, in particular, the quantification of the fluorescence of protoporphyrin IX.

Further exemplary embodiments of microscopy optical units are explained below, the wavelength-dependent transmission characteristics of which realize such different values of the variables $U_{1F}$ and $U_{1A}$, and $U_{2F}$ and $U_{2A}$ in different ways.

Figure 3:
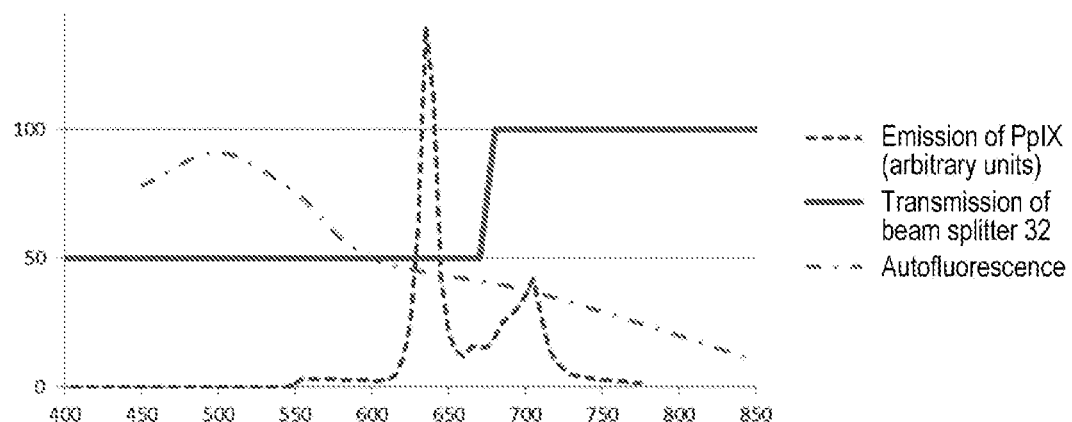
FIG. 3 shows a graph plotting an autofluorescence of a tissue, the emission of protoporphyrin IX and a transmission of a beam splitter of the microscopy system of FIG. 1 according to a second exemplary embodiment.

FIG. 3 shows a graph, corresponding to FIG. 2, having a modified transmission of the beam splitter 32; the method explained above can likewise be carried out therewith. Here, the wavelength-dependent detection efficiency of the two detector fields may be determined substantially by the beam splitter. Nevertheless, filters are provided in the beam paths in practice, the filters preventing fluorescence excitation light from being detected by the detector fields. However, the effects of such filters are not illustrated in FIGS. 1 to 8.

Figure 4:
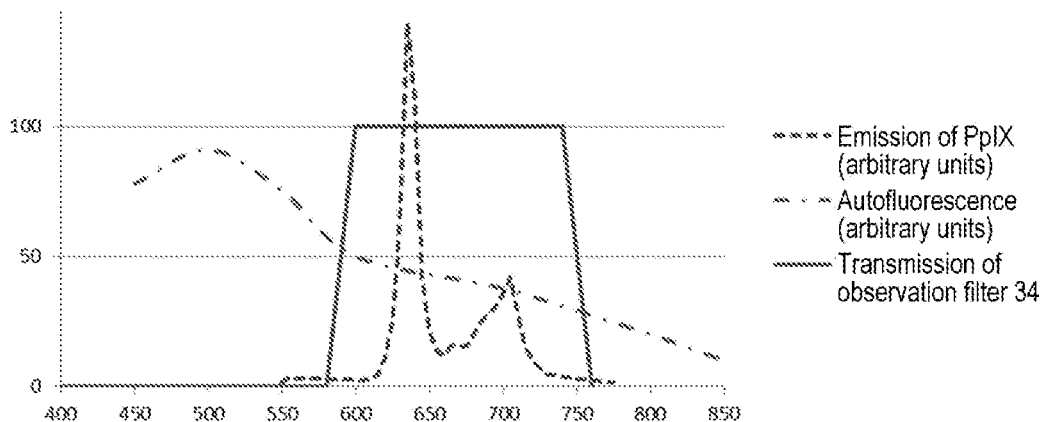
FIG. 4 shows a graph plotting an autofluorescence of a tissue, the emission of protoporphyrin IX and a transmission of a filter of the microscopy system of FIG. 1 according to a third exemplary embodiment.
Figure 5:
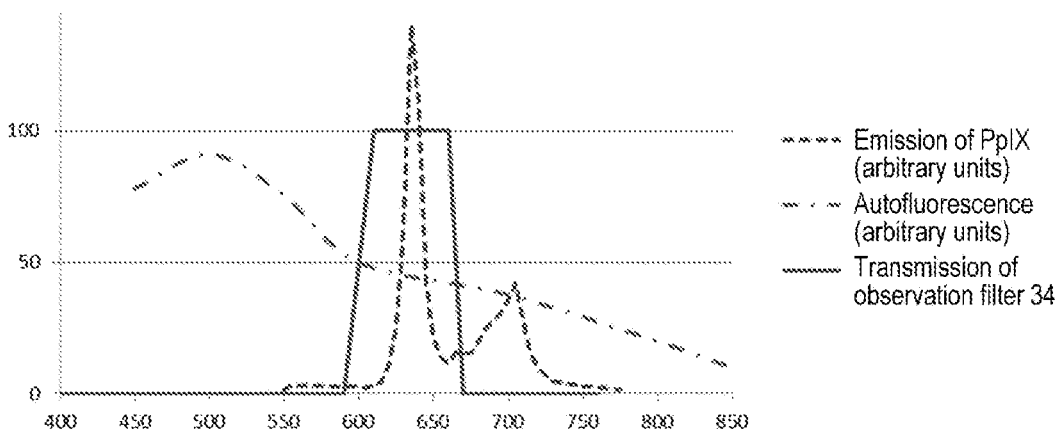
FIG. 5 shows a graph plotting an autofluorescence of a tissue, the emission of protoporphyrin IX and a transmission of a filter of the microscopy system of FIG. 1 according to a fourth exemplary embodiment.
Figure 6:
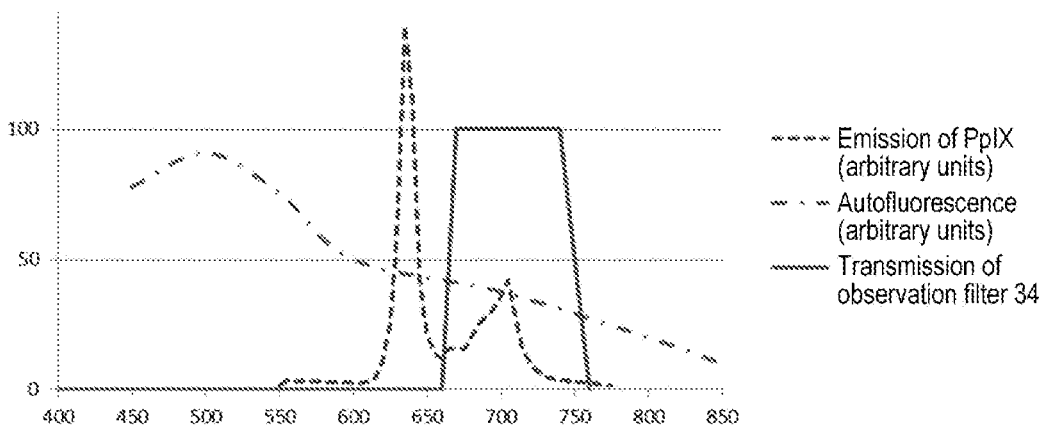
FIG. 6 shows a graph plotting an autofluorescence of a tissue, the emission of protoporphyrin IX and a transmission of a filter of the microscopy system of FIG. 1 according to a fifth exemplary embodiment.

FIGS. 4, 5, and 6 show graphs corresponding to FIGS. 2 and 3, the graphs in each case once again showing the emission spectra of protoporphyrin IX and the autofluorescence and, further, the graphs plotting the wavelength-dependent transmission characteristics of the optical filter 34. In these embodiments, the filter 34 only arranged upstream of the infrared camera 21 in the first beam path leads to the variables $U_{1F}$ and $U_{1A}$ and $U_{2F}$ and $U_{2A}$ having the significantly different values. In these embodiments, the beam splitter 32 need not have a strongly dichroic embodiment.

Figure 7:
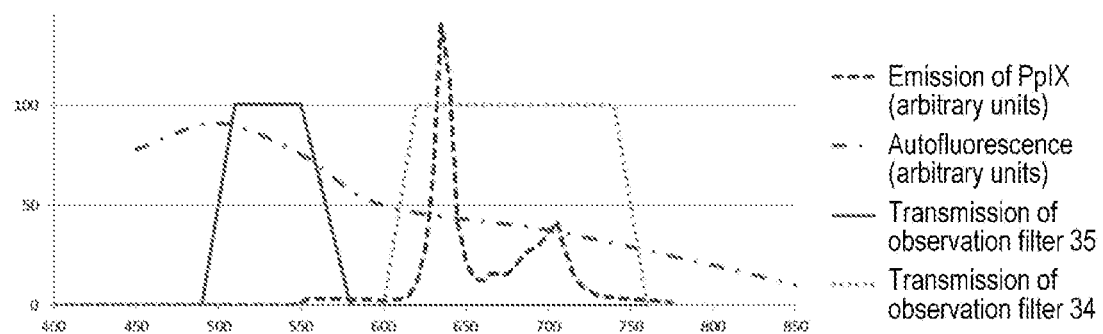
FIG. 7 shows a graph plotting an autofluorescence of a tissue, the emission of protoporphyrin IX and a transmission of a filter of the microscopy system of FIG. 1 according to a sixth exemplary embodiment.

FIG. 7 shows a graph corresponding to FIGS. 2 to 6, the graph once again showing the emission spectra of protoporphyrin IX and the autofluorescence and, further, the graph plotting the wavelength-dependent transmission characteristics of the optical filter 34 and 35. In these embodiments, the two filters 34 and 35, which are respectively arranged in different beam paths, lead to the variables $U_{1F}$ and $U_{1A}$, and $U_{2F}$ and $U_{2A}$ having the significantly different values. In these embodiments, the beam splitter 32 need not have a strongly dichroic embodiment.

Figure 8:
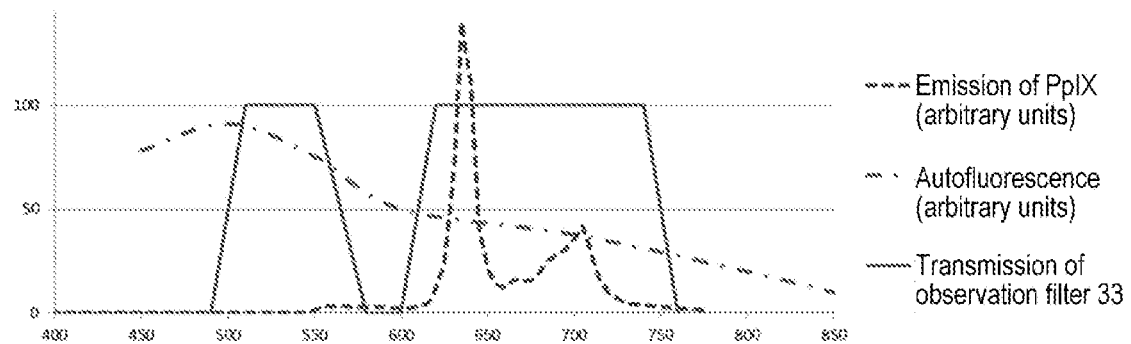
FIG. 8 shows a graph plotting an autofluorescence of a tissue, the emission of protoporphyrin IX and a transmission of a filter of the microscopy system of FIG. 1 according to a seventh exemplary embodiment.

FIG. 8 shows a graph corresponding to FIGS. 2 to 7, the graph once again showing the emission spectra of protoporphyrin IX and the autofluorescence and, further, the graph plotting the wavelength-dependent transmission characteristic of the optical filter 33. The curve of the wavelength-dependent transmission characteristic of the optical filter 33 is similar to that of the two filters 34 and 35 in FIG. 7, with, however, the filter 33 being arranged in both beam paths and therefore not being able, on its own, to cause the variables $U_{1F}$ and $U_{1A}$, and $U_{2F}$ and $U_{2A}$ to have the significantly different values. However, this is nevertheless achieved since, for example, the infrared camera 21 is not sensitive at wavelengths below 590 nm and/or the color camera 23 is not sensitive at wavelengths above 600 nm and/or the beam splitter has dichroic properties as shown, for example, in FIGS. 2 and 3.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A microscopy method for quantifying a fluorescence of protoporphyrin IX, the method comprising:
    imaging an object region onto a first detector field having a multiplicity of first pixels, wherein at least one first optical filter with a first wavelength-dependent transmission characteristic is arranged in a first beam path between the object region and each one of the pixels of the first detector field;
    imaging the object region onto a second detector field having a multiplicity of second pixels, wherein at least one second optical filter with a second wavelength-dependent transmission characteristic that differs from the first wavelength-dependent transmission characteristic is arranged in a second beam path between the object region and each one of the pixels of the second detector field;
    exciting at least a first fluorescence and a second fluorescence in the object region, wherein the first fluorescence is the fluorescence of protoporphyrin IX;
    recording a first image of the imaged object region using the first detector field;
    recording a second image of the imaged object region using the second detector field; and
    determining a spatially dependent fluorescence intensity of the first fluorescence in the object region by determining in each case a fluorescence intensity value for a plurality of first pixels or a plurality of groups of first pixels in the first detector field, the fluorescence intensity value representing a fluorescence intensity at a location in the object region imaged onto the respective first pixel or the respective group of first pixels,
    wherein the fluorescence intensity value is determined from a radiation intensity detected by the respective first pixel or group of first pixels of the first detector field, a wavelength-dependent detection efficiency of the respective first pixel or group of first pixels, a radiation intensity detected by a second pixel or group of second pixels of the second detector field on which the location in the object region is imaged, a wavelength-dependent detection efficiency of the second pixel or group of second pixels, a fluorescence spectrum of the first fluorescence, and a fluorescence spectrum of the second fluorescence,
    wherein the respectively determined fluorescence intensity value is determinable according to the following formula:

$$C_F(x, y) = \frac{U_{1A} \cdot S_2(k, l) - U_{2A} \cdot S_1(i, j)}{U_{2F} \cdot U_{1A} - U_{2A} \cdot U_{1F}},$$

and
wherein:
    $C_F(x,y)$ is the fluorescence intensity value representing a fluorescence intensity of protoporphyrin IX at a location (x,y) in the object plane,
    $S_1(i,j)$ represents a radiation intensity detected by the first pixel (i,j) or group (i,j) of first pixels of the first detector field, wherein the location (x,y) is mapped onto the first pixel (i,j) or group (i,j) of first pixels by way of the first beam path,
    $S_2(k,l)$ represents the radiation intensity detected by the second pixel (k,l) or group (k,l) of second pixels of the second detector field, wherein the location (x,y) is mapped onto the second pixel (k,l) or group (k,l) of second pixels by way of the second beam path, and
    $U_{1F}$, $U_{1A}$, $U_{2F}$, and $U_{2A}$ are variables which depend on wavelength-dependent detection efficiencies of the first and second pixels or first and second group of pixels.

2. The microscopy method according to claim 1, further comprising:
    determining values for at least some of the variables $U_{1F}$, $U_{1A}$, $U_{2F}$, and $U_{2A}$ in a reference measurement at a location in the object region in which a concentration of protoporphyrin IX is substantially zero.

3. The microscopy method according to claim 1, further comprising:
    determining values of at least some of the variables $U_{1F}$, $U_{1A}$, $U_{2F}$, and $U_{2A}$ by calculating an associated equation selected from the group consisting of:

$$U_{1F} = \int_{\lambda_{min}}^{\lambda_{max}} S_F(\lambda) \cdot D_{1,i,j}(\lambda) \cdot d\lambda,$$

$$U_{2F} = \int_{\lambda_{min}}^{\lambda_{max}} S_F(\lambda) \cdot D_{2,k,l}(\lambda) \cdot d\lambda,$$

$$U_{1A} = \int_{\lambda_{min}}^{\lambda_{max}} S_A(\lambda) \cdot D_{1,i,j}(\lambda) \cdot d\lambda, \text{ and}$$

$$U_{2A} = \int_{\lambda_{min}}^{\lambda_{max}} S_A(\lambda) \cdot D_{2,k,l}(\lambda) \cdot d\lambda,$$

and
wherein:
    $S_F(\lambda)$ represents the fluorescence spectrum of the first fluorescence,
    $S_A(\lambda)$ represents the fluorescence spectrum of the second fluorescence,
    $D_{1,i,j}(\lambda)$ represents a detection efficiency, dependent on a wavelength $\lambda$, of the first pixel (i,j) or group (i,j) of first pixels of the first detector field,
    $D_{2,i,j}(\lambda)$ represents the detection efficiency, dependent on the wavelength $\lambda$, of the second pixel (k,l) or group (k,l) of second pixels of the second detector field, $\lambda$min represents a minimum wavelength, and
$\lambda$max represents a maximum wavelength.

4. The microscopy method according to claim 3, wherein min lies between 400 nm and 600 nm and max lies between 750 nm and 850 nm.

5. The microscopy method according to claim 3, wherein,
for all first pixels (i,j) or groups (i,j) of first pixels of the first detector field, $D1,i,j(\lambda)$ is set equal to $D1(\lambda)$;
for all second pixels (k,l) or groups (k,l) of second pixels of the second detector field, $D2,k,l(\lambda)$ is set equal to $D2(\lambda)$; or
for all first pixels (i,j) or groups (i,j) of first pixels of the first detector field, $D1,i,j(\lambda)$ is set equal to $D1(\lambda)$ and for all second pixels (k,l) or groups (k,l) of second pixels of the second detector field, $D2,k,l(\lambda)$ is set equal to $D2(\lambda)$.

6. The microscopy method according to claim 3, wherein at least one of:
$D1,i,j(\lambda)$ is set equal to $T1,i,j(\lambda)$, where $T1,i,j(\lambda)$ is a wavelength-dependent transmission characteristic of the at least one first optical filter arranged in the first beam path between the object region and the first pixel (i,j) or group (i,j) of first pixels of the first detector field; or
$D2,k,l(\lambda)$ is set equal to $T2,k,l(\lambda)$, where $T2,k,l(\lambda)$ is the wavelength-dependent transmission characteristic of the at least one second optical filter arranged in the second beam path between the object region and the second pixel (k,l) or group (k,l) of second pixels of the second detector field.

7. The microscopy method according to claim 3, wherein at least one of $D1,i,j(\lambda)$ or $D2,k,l(\lambda)$ is determined experimentally.

8. The microscopy method according to claim 1, further comprising:
blocking light in the first beam path and the second beam path, wherein the blocked light has an excitation light wavelength for exciting the at least two fluorescences.

9. A microscopy method for quantifying a fluorescence of protoporphyrin IX, the method comprising:
imaging an object region onto a first detector field having a multiplicity of first pixels,
wherein at least one first optical filter with a first wavelength-dependent transmission characteristic is arranged in a first beam path between the object region and each one of the pixels of the first detector field;
imaging the object region onto a second detector field having a multiplicity of second pixels, wherein at least one second optical filter with a second wavelength-dependent transmission characteristic that differs from the first wavelength-dependent transmission characteristic is arranged in a second beam path between the object region and each one of the pixels of the second detector field;
exciting at least a first fluorescence and a second fluorescence in the object region, wherein the first fluorescence is the fluorescence of protoporphyrin IX;
recording a first image of the imaged object region using the first detector field;
recording a second image of the imaged object region using the second detector field; and
determining a spatially dependent fluorescence intensity of the first fluorescence in the object region by determining in each case a fluorescence intensity value for a plurality of first pixels or a plurality of groups of first pixels in the first detector field, the fluorescence intensity value representing a fluorescence intensity at a location in the object region imaged onto the respective first pixel or the respective group of first pixels,
wherein the fluorescence intensity value is determined from a radiation intensity detected by the respective first pixel or group of first pixels of the first detector field, a wavelength-dependent detection efficiency of the respective first pixel or group of first pixels, a radiation intensity detected by a second pixel or group of second pixels of the second detector field on which the location in the object region is imaged, a wavelength-dependent detection efficiency of the second pixel or group of second pixels, a fluorescence spectrum of the first fluorescence, and a fluorescence spectrum of the second fluorescence, and
wherein, for a first wavelength and a second wavelength:
a transmission at the first wavelength of the at least one first filter arranged between a location (x,y) in the object region and the first pixel (i,j) or group (i,j) of first pixels of the first detector field on which the location (x,y) is imaged is at least 1.5 times greater than the transmission at the first wavelength of the at least one second filter arranged between the location (x,y) in the object region and the second pixel (k,l) or group (k,l) of second pixels of the second detector field on which the location (x,y) is imaged, and
the transmission at the second wavelength of the at least one first filter arranged between the location (x,y) in the object region and the first pixel (i,j) or group (i,j) of first pixels of the first detector field is at least 1.5 times smaller than the transmission at the second wavelength of the at least one second filter arranged between the location (x,y) in the object region and the second pixel (k,l) or group (k,l) of second pixels of the second detector field.

10. The microscopy method according to claim 9, wherein the first wavelength is longer than 610 nm and shorter than 750 nm.

11. The microscopy method according to claim 9, wherein the second wavelength is shorter than 610 nm or longer than 750 nm.

12. The microscopy method according to claim 9, wherein the first wavelength is longer than 610 nm and shorter than 670 nm and the second wavelength is shorter than 610 nm or longer than 670 nm.

13. The microscopy method according to claim 9, wherein the first wavelength is longer than 670 nm and shorter than 750 nm and the second wavelength is shorter than 670 nm or longer than 750 nm.

14. The microscopy method according to claim 9, further comprising:
blocking light in the first beam path and the second beam path, wherein the blocked light has an excitation light wavelength for exciting the at least two fluorescences.

15. A microscopy system configured to carry out the method according to claim 1.

16. The microscopy system according to claim 15, further comprising:
an objective lens being arranged in the first beam path between the object region and the first detector field, and being arranged in the second beam path between the object region and the second detector field; and
a beam splitter being arranged in the first beam path between the object region and the first detector field, and being arranged in the second beam path between the object region and the second detector field.

17. The microscopy system according to claim 16, wherein the first optical filter and the second optical filter comprise the beam splitter, and wherein the beam splitter is a dichroic beam splitter.

18. The microscopy system according to claim 15, wherein a field of optical filters is arranged in at least one of the first beam path and the second beam path upstream of the first detector field and the second detector field, and wherein different optical filters are arranged in the beam path upstream of mutually adjacent pixels, the different optical filters having mutually different spectral transmission characteristics.

19. The microscopy system according to claim 15, further comprising:

a controller which reads detection signals of the first detector field and of the second detector field and which is configured to determine the fluorescence intensity values which represent the spatially dependent fluorescence intensity of the first fluorescence.

20. The microscopy system according to claim 19, further comprising:

a display apparatus, wherein the controller is further configured to present the fluorescence intensity values as an image on the display apparatus.

21. A microscopy system configured to carry out the method according to claim 9.

22. The microscopy system according to claim 21, further comprising:

an objective lens being arranged in the first beam path between the object region and the first detector field, and being arranged in the second beam path between the object region and the second detector field; and a beam splitter being arranged in the first beam path between the object region and the first detector field, and being arranged in the second beam path between the object region and the second detector field.

23. The microscopy system according to claim 22, wherein the first optical filter and the second optical filter comprise the beam splitter, and wherein the beam splitter is a dichroic beam splitter.

24. The microscopy system according to claim 21, wherein a field of optical filters is arranged in at least one of the first beam path and the second beam path upstream of the first detector field and the second detector field, and wherein different optical filters are arranged in the beam path upstream of mutually adjacent pixels, the different optical filters having mutually different spectral transmission characteristics.

25. The microscopy system according to claim 21, further comprising:

a controller which reads detection signals of the first detector field and of the second detector field and which is configured to determine the fluorescence intensity values which represent the spatially dependent fluorescence intensity of the first fluorescence.

26. The microscopy system according to claim 25, further comprising:

a display apparatus, wherein the controller is further configured to present the fluorescence intensity values as an image on the display apparatus.

* * * * *

UNITED STATES PATENT AND TRADEMARK OFFICE
CERTIFICATE OF CORRECTION

Page 1 of 1

PATENT NO. : 11,079,587 B2
APPLICATION NO. : 15/910225
DATED : August 3, 2021
INVENTOR(S) : Regensburger et al.

It is certified that error appears in the above-identified patent and that said Letters Patent is hereby corrected as shown below:

On the Title Page

Item (72) change:
(72) Inventor: Alois Regensburger, Erlangen (DE)
To:
(72) Inventor: Alois Regensburger, Poxdorf (DE)

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*